(12) United States Patent
Musso et al.

(10) Patent No.: US 6,255,273 B1
(45) Date of Patent: Jul. 3, 2001

(54) HYDROFLUOROPOLYETHER-BASED AZEOTROPIC OR NEAR AZEOTROPIC COMPOSITIONS

(75) Inventors: Ezio Musso; Giampiero Basile; Sauro Girolomoni, all of Alessandria (IT)

(73) Assignee: Ausimont S.p.A., Milan (IT)

( * ) Notice: Subject to any disclaimer, the term of this patent is extended or adjusted under 35 U.S.C. 154(b) by 0 days.

(21) Appl. No.: 09/374,871

(22) Filed: Aug. 16, 1999

(30) Foreign Application Priority Data

Aug. 19, 1998 (IT) .................................. MI98A1904

(51) Int. Cl.[7] .............................. C11D 7/50; C23G 5/028; C23G 5/032
(52) U.S. Cl. .................. 510/411; 510/175; 510/177; 510/408; 510/412; 510/415; 134/2
(58) Field of Search ..................................... 510/405, 407, 510/408, 411, 412, 415, 175, 177; 134/2

(56) References Cited

FOREIGN PATENT DOCUMENTS

| 0 695 775 A1 | 2/1996 | (EP) . |
| 0 805 199 A2 | 11/1997 | (EP) . |
| 0979839A2 | * 7/1999 | (IT) . |
| 0980890A1 | * 7/1999 | (IT) . |
| 0980910A2 | * 2/2000 | (IT) . |
| WO99/63043 | * 12/1999 | (WO) . |

* cited by examiner

Primary Examiner—Yogendra N. Gupta
Assistant Examiner—Gregory E. Webb
(74) Attorney, Agent, or Firm—Arent Fox Kintner Plotkin & Kahn PLLC

(57) ABSTRACT

Azeotropic or near azeotropic compositions based on difluoromethoxy-bis(difluoromethyl ether) and/or 1-difluoromethoxy-1,1,2,2-tetrafluoroethyl difluoromethyl ether.

20 Claims, No Drawings

HYDROFLUOROPOLYETHER-BASED AZEOTROPIC OR NEAR AZEOTROPIC COMPOSITIONS

The present invention relates to azeotropic or near azeotropic compositions based on hydrofluoropolyethers (HFPE) to be used as substitutes of 1,1,2-trichloro-1,2,2-trifluoroethane (CFC 113) as a solvent.

More specifically the present invention relates to azeotropic or near azeotropic mixtures characterized by ODP (ozone Depletion Potential) values equal to zero or lower than 0.02, by low GWP (Global Warming Potential) and VOC (Volatile Organic Compounds) values to be used as detergents, i.e. as solvent for cleaning and drying agents in substitution of CFC 113.

As it is known, CFC 113 has been widely used as solvent and/or drying agent for industrial applications requiring the removal of organic substances (greases, waxes, oils, resins) and/or water from solid surfaces of various nature (metal, glass, plastics or composites surfaces).

For example, CFC 113 has been commonly used for the degreasing and removal of abrasives from metal surfaces of mechanical parts having complex shapes, for the cleaning of high quality and high precision metallic components for which an accurate surface cleaning is required and for the removal of water traces from valuable articles and from high quality components previously subjected to washing with aqueous mediums.

Specifically in the electronic field CFC 113 has been used for the removal of organic products and moisture traces present on the surface of molded circuits characterized by an high density of hardly washable components and for which an high reliability is required.

Contaminant removal processes from solid surfaces (metals, plastic materials, glass) are carried out by methods implying the solvent action in liquid phase (cold or hot) and/or by vapour action; in the latter case the article is exposed to the fluid vapours at its boiling temperatures. Vapours, by condensing on the article cold surface perform the solvent and cleaning action.

In these applications CFC 113 has often been used also in combination with organic solvents, in particular as azeotropic or near azeotropic mixtures in order to substantially have the same composition in the vapour and in the liquid phase and to avoid fractionations during the application phases in industrial cleaning processes, during the handling, distillation and recovery steps of the exhausted solvent.

CFC 113 is characterized by particular chemical-physical properties such as to be advantageously used in the previously described field and allows, furthermore, a simple, cheap and safe use since it is stable, non flammable and non toxic.

CFCs and specifically CFC 113 have, however, the drawback to involve an high destroying power on the stratospheric ozone layer, wherefore, the production and commercialization have been subjected to regulations and then banned since Jan. 1, 1995.

The need was felt to identify substitutes able to replace CFC 113 in the mentioned use fields while respecting and protecting the environment.

To this purpose, in the solvency field, the use of alternative systems based on aqueous solutions, of non halogenated organic solvents and of hydrohalogenated solvents of HCFC type has been proposed.

The alternatives using the aqueous system imply however various inconveniences.

In particular it happens that articles with microhollow, capillary holes and surface irregularities, are insufficiently washed due to the relatively high water surface pressure, also in the presence of surfactants.

The water removal rate is very low and if this is not completely removed, it can be the cause of corrosion phenomena of the metal articles previously subjected to washing. Therefore such surfaces must be suitably dried after they have been cleansed.

Hydrocarbons, alcohols or other non halogenated organic solvents, due to their high flammability, have not a generalized use and require in any case great investments in order to avoid fire and explosion risks in the plants using them.

Furthermore, these solvents represent an atmospheric pollution source, since, if exposed to the sun light in the presence of nitrogen oxides, undergo oxidative degradation phenomena, with the formation of the so called ozone-rich oxidizing smog. For this negative characteristic these products are classified as VOC (Volatile Organic Compound) compounds.

The hydrohalogenated solvents represent a class of products more similar to CFC 113, they give lower use complications and allow more generalized applications in comparison with the above mentioned alternative systems.

HCFC 141b, which is one of the most valid substitutes for these applications, has however the disadvantage to be moderately flammable and especially to be characterized by an ODP value equal to 0.11 (CFC 11 has ODP=1) and therefore it has been subjected to limitations.

The use of non toxic solvents having a low environmental impact, constituted by hydrofluoropolyethers and compositions thereof having limited concentrations of polar substances selected from alcohols, ketones and ethers as described in the European patent application EP 805,199 is known in the field of oil, grease, wax etc., removal from surfaces.

In said application no reference is made to mixtures having azeotropic or near azeotropic behaviour to be used in the industrial solvency field.

In connection with what described in the prior art the need was felt to have available substitutes to CFC 113.

It was indeed necessary to have available products able to remove oily substances similarly to CFC 113, i.e. by partial or total solubilization of the substances to be removed, therefore differently from pure or additivated hydrofluoropolyethers, in order to guarantee a more accurate and quicker cleaning of articles having complex shapes and microhollows, with remarkable advantages in efficiency and economic saving terms of the same cleaning operation.

Preferably the substitutes of CFC 113 should be drop-in, i.e. the substitutes should be used in the existing plants without involving substantial modifications and allow to maintain practically unchanged the various operating steps of the article cleaning process.

Finally, the need was evident to limit or eliminate the environmental and safety problems typical of the conventional solvents (hydrocarbons, HCFC), and to reduce the cleaning operation costs deriving from the pure or only addivitated HFPE use, since, as known, these products are obtained by complex and expensive processes.

The Applicant has surprisingly and unexpectedly found that as substitutes of CFC 113 hydrofluoropolyether-based (HFPE) mixtures, object of the present invention, have azeotropic or near azeotropic behaviour, they are drop-in of CFC 113, have an environmental impact expressed in ODP terms equal to zero or <0.02 and low GWP and VOC values.

It is therefore an object of the present invention azeotropic or near azeotropic compositions, based on difluoromethoxy-bis(difluoromethyl ether) (HFPE1) and on 1-difluoromethoxy-1,1,2,2-tetrafluoroethyl (AF 9925/031.EST) difluoromethyl ether (HFPE2), to be used as substitutes of CFC 113, consisting essentially of:

|  |  | composition % by weight | |
|---|---|---|---|
|  |  | general | preferred |
| I) | difluoromethoxy bis(difluoromethyl ether) (HCF$_2$OCF$_2$OCF$_2$H); | 2–60 | 2–54 |
|  | 1,1-dichloro-2,2,2-trifluoroethane (CHCl$_2$CF$_3$, HCFC 123) | 98–40 | 98–46 |
| II) | difluoromethoxy bis(difluoromethyl ether) (HCF$_2$OCF$_2$OCF$_2$H); | 1–95 | 25–95 |
|  | n-pentane | 99–5 | 75–5 |
| III) | difluoromethoxy bis(difluoromethyl ether) (HFC$_2$OCF$_2$OCF$_2$H); | 1–99 | 25–98 |
|  | iso-pentane | 99–1 | 75–2 |
| IV) | difluoromethoxy bis(difluoromethyl ether) (HCF$_2$OCF$_2$OCF$_2$H); | 1–60 | 20–60 |
|  | dimethyl ketone (acetone) | 99–40 | 80–40 |
| V) | difluoromethoxy bis(difluoromethyl ether) (HCF$_2$OCF$_2$OCF$_2$H); | 1–99 | 10–98 |
|  | 1,1,1,3,3-pentafluorobutane (CF$_3$CH$_2$CF$_2$CH$_3$, HFC 365 mfc) | 99–1 | 90–2 |
| VI) | difluoromethoxy bis(difluoromethyl ether) (HCF$_2$OCF$_2$OCF$_2$H); | 1–40 | 10–40 |
|  | 1,1,1,4,4,4-hexafluorobutane (CF$_3$CH$_2$CH$_2$CF$_3$, HFC 356 ffa) | 99–60 | 90–60 |
| VII) | difluorometoxy bis(difluoromethyl ether) (HCF$_2$OCF$_2$OCF$_2$H); | 1–96 | 25–96 |
|  | methoxymethyl methylether | 99–14 | 75–14 |
| VIII) | difluoromethoxy bis(difluoromethyl ether) (HCF$_2$OCF$_2$OCF$_2$); | 30–99 | 35–98 |
|  | n-hexane | 70–1 | 65–2 |
| IX) | difluoromethoxy bis(difluoromethyl ether) (HCF$_2$OCF$_2$OCF$_2$); | 1–99 | 18–95 |
|  | trans 1,2-dichloroethylene (ClCHCHCl, tDCE) | 99–1 | 82–5 |
| X) | 1-difluoromethoxy 1,1,2,2-tetrafluoroethyl difluoromethyl ether (HCF$_2$OCF$_2$CF$_2$OCF$_2$H); | 1–93 | 25–93 |
|  | n-pentane | 99–7 | 75–7 |
| XI) | 1-difluoromethoxy 1,1,2,2-tetrafluoroethyl difluoromethyl ether (HCF$_2$OCF$_2$CF$_2$OCF$_2$H); | 30–99 | 50–98 |
|  | dimethyl ketone (acetone) | 70–1 | 50–2 |
| XII) | 1-difluoromethoxy 1,1,2,2-tetrafluoroethyl difluoromethyl ether (HCF$_2$OCF$_2$CF$_2$OCF$_2$H); | 50–99 | 60–98 |
|  | methyl alcohol | 50–1 | 40–2 |
| XIII) | 1-difluoromethoxy 1,1,2,2-tetrafluoroethyl difluoromethyl ether (HCF$_2$OCF$_2$CF$_2$OCF$_2$H); | 15–99 | 25–98 |
|  | n-hexane | 85–1 | 75–2 |
| XIV) | 1-difluoromethoxy 1,1,2,2-tetrafluoroethyl difluoromethyl ether (HCF$_2$OCF$_2$CF$_2$OCF$_2$H); | 1–99 | 15–95 |
|  | trans 1,2-dichloroethylene (ClCHCHCl) | 99–1 | 85–5 |

-continued

|  |  | composition % by weight | |
|---|---|---|---|
|  |  | general | preferred |
| XV) | 1-difluoromethoxy 1,1,2,2-tetrafluoroethyl difluoromethyl ether (HCF$_2$OCF$_2$CF$_2$OCF$_2$H); | 5–99 | 10–98 |
|  | ethyl alcohol | 95–1 | 90–2 |

More specifically the azeotropic compositions, i.e. showing an absolute minimum or maximum in the boiling temperature at the pressure of 1.013 bar with respect to the pure products is noticed, are defined as follows:

|  |  | Compositions are defined within +/− 2% by weight |
|---|---|---|
| A) | difluoromethoxy-bis(difluoromethyl ether) (HCF$_2$OCF$_2$OCF$_2$H); | 24% by wt. |
|  | 1,1-dichloro-2,2,2-trifluoroethane (CHCl$_2$CF$_3$, HCFC 123) | 76% by wt. |
| B) | difluoromethoxy-bis(difluoromethyl ether) (HCF$_2$OCF$_2$OCF$_2$H); | 62% by wt. |
|  | n-pentane | 38% by wt. |
| C) | difluoromethoxy-bis(difluoromethyl ether) (HCF$_2$OCF$_2$OCF$_2$H); | 63% by wt. |
|  | iso-pentane | 36% by wt. |
| D) | difluoromethoxy-bis(difluoromethyl ether) (HCF$_2$OCF$_2$OCF$_2$H); | 42% by wt. |
|  | dimethyl ketone (acetone) | 58% by wt. |
| E) | difluoromethoxy-bis(difluoromethyl ether) (HCF$_2$OCF$_2$OCF$_2$H); | 60% by wt. |
|  | 1,1,1,3,3-pentafluorobutane (CF$_3$CH$_2$CF$_2$CH$_3$, HFC 365 mfc) | 40% by wt. |
| F) | difluoromethoxy-bis(difluoromethyl ether) (HCF$_2$OCF$_2$OCF$_2$H); | 20% by wt. |
|  | 1,1,1,4,4,4-hexafluorobutane (CF$_3$CH$_2$CH$_2$CF$_3$, HFC 356 ffa) | 80% by wt. |
| C) | difluoromethoxy-bis(difluoromethyl ether) (HCF$_2$OCF$_2$OCF$_2$H); | 59% by wt. |
|  | methoxymethyl methyl ether | 41% by wt. |
| H) | difluoromethoxy-bis(difluoromethyl ether) (HCF$_2$OCF$_2$OCF$_2$H); | 75% by wt. |
|  | n-hexane | 25% by wt. |
| I) | difluoromethoxy-bis(difluoromethyl ether) (HCF$_2$OCF$_2$OCF$_2$H); | 75% by wt. |
|  | trans 1,2-dichloroethylene (ClCHCHCl, tDCE) | 25% by wt. |
| L) | 1-difluoromethoxy-1,1,2,2-tetrafluoroethyl difluoromethyl ether (HCF$_2$OCF$_2$CF$_2$OCF$_2$H); | 61% by wt. |
|  | n-pentane | 39% by wt. |
| M) | 1-difluoromethoxy-1,1,2,2-tetrafluoroethyl difluoromethyl ether (HCF$_2$OCF$_2$CF$_2$OCF$_2$H); | 79% by wt. |
|  | dimethyl ketone (acetone) | 21% by wt. |
| N) | 1-difluoromethoxy-1,1,2,2-tetrafluoroethyl difluoromethyl ether (HCF$_2$OCF$_2$CF$_2$OCF$_2$H); | 94% by wt. |
|  | methyl alcohol | 6% by wt. |
| Q) | 1-difluoromethoxy-1,1,2,2-tetrafluoroethyl difluoromethyl ether (HCF$_2$OCF$_2$CF$_2$OCF$_2$H); | 74% by wt. |
|  | n-hexane | 26% by wt. |
| P) | 1-difluoromethoxy-1,1,2,2-tetrafluoroethyl difluoromethyl ether (HCF$_2$OCF$_2$CF$_2$OCF$_2$H); | 50% by wt. |
|  | trans 1,2-dichloroethylene (ClCHCHCl, tDCE) | 50% by wt. |

-continued

| | | Compositions are defined within +/− 2% by weight |
|---|---|---|
| Q) | 1-difluoromethoxy-1,1,2,2-tetrafluoroethyl difluoromethyl ether ($HCF_2OCF_2CF_2OCF_2H$); | 95% by wt. |
| | ethyl alcohol | 5% by wt. |

The azeotropic or near azeotropic mixtures, object of the present invention, are based on two hydrofluoropolyethers: HFPE1 and HFPE2, obtained by alkaline salt decarboxylation processes obtained by hydrolysis and salification of the corresponding acylfluorides, using processes known in the art. For example, decarboxylation is carried out in the presence of hydrogen-donor compounds, for example water, at temperatures of 140–170° C. and under a pressure of at least 4 atm. See for example EP 695,775 and the examples reported therein; this patent is herein incorporated by reference.

The main features of the two hydrofluoropolyethers of the azeotropic or near azeotropic mixtures, are reported in Table 1 in comparison with CFC 113.

The fluids in Table I are characterized by a combination of chemical-physical properties such as chemical inertia, high thermal stability, non flammability, evaporation heat and boiling temperature such as to be particularly suitable, in admixture with other organic solvents as defined above, for the CFC 113 substitution in the above mentioned industrial applications.

Preliminary studies relating to acute toxicity show that the products have a low biologic activity.

The Applicant has found that the particular distribution of the hydrogen atoms on the terminal ends and the presence of an ethereal bond prevents dehydrofluorination reactions, which lead to the formation of potentially toxic olefins and avoids the acidity formation which involves metal material corrosion phenomena.

The HFPEs of the invention have an ODP value equal to zero and a low GWP.

The HFPE-based mixtures offer an advantageous combination of the boiling temperature and evaporation heat such as to give them a detergency/drying time suitably short and fit to the continuous operations, both in liquid and in vapour phase.

The evaporation heat is sufficiently low and such as not to allow the solidification of the water trace which must be removed.

In the detergency, solvency and drying applications, the use of mixtures having an azeotropic or near azeotropic behaviour is essential, in order to avoid segregations or meaningful variations of the fluid composition during the industrial processes phases involving phase change phenomena (evaporation and condensation), as in the solvency case, and, more generally, during all the fluid handling and storage operations in which accidental leaks can take place due to liquid evaporation and consequently variations of the composition of the fluid.

The composition variations which take place in all the cases wherein non azeotropic mixtures are used, involve deviations of the solvent agent performances and the need to make appropriated refillings in order to restore the original composition and therefore the mixture chemical-physical characteristics.

Furthermore, when the non azeotropic or non near-azeotropic compositions contain more volatile flammable components, the vapour phase becomes rich in such component until reaching the flammability limit, with evident risks for the use safety. Likewise, when the flammable component is less volatile, it concentrates in the liquid phase giving rise to a flammable liquid.

Mixtures having azeotropic or near azeotropic behaviour avoid the above disadvantage even when a flammable compound is present An azeotrope is a particular composition which has singular chemical-physical, unexpected and unforeseeable properties of which the most important ones are reported hereinafter.

An azeotrope is a mixture of two or more fluids which has the same composition in the vapour phase and in the liquid one when it is in equilibrium under determined conditions.

The azeotropic composition is defined by particular temperature and pressure values; in these conditions the mixtures undergo phase changes at constant composition and temperature as pure compounds.

A near azeotrope is a mixture of two or more fluids which has a vapour composition substantially equal to that of the liquid and undergo phase passages without substantially modifying the composition and temperature. A composition is near azeotropic when, after evaporation at a constant temperature of 50% of the liquid initial mass, the per cent variation of the vapour pressure between the initial and final composition results lower than 10%; in the case of an azeotrope, no variation of the vapour pressure between the initial composition and the one obtained after the 50% liquid evaporation is noticed.

Azeotropic or near azeotropic mixtures belong to the cases showing meaningful, both positive and negative, deviations from the Raoult law. As known to the skilled in the art, such law is valid for ideal systems.

When such deviations are sufficiently marked, the mixture vapour pressure in the azeotropic point must be therefore characterized by values either higher or lower than those of the pure compounds.

It is evident that, if the mixture vapour pressure curve shows a maximum, this corresponds to a minimum of boiling temperature; viceversa to a vapour pressure minimum value, a maximum of boiling temperature corresponds.

The azeotropic mixture has only one composition for each temperature and pressure value.

However, by changing temperature and pressure, more azeotropic compositions starting from the same components can be obtained.

For example, the combination of all the compositions of the same components which have a minimum or a maximum in the boiling temperature at different pressure levels form an azeotropic composition field.

It has been found that the near azeotropic compositions of points I, III, IV, V, VI, VII remain near azeotropic also when a portion of difluoromethoxy-bis(difluoromethyl ether) is substituted with 1-difluoromethoxy-1,1,2,2-tetrafluoroethyldifluoromethyl ether up to 40% by weight.

The same for compositions of points XI, XII and XV when a portion of 1-difluoromethoxy-1,1-2,2-tetrafluoroethyl difluoromethyl ether is substituted by difluoromethoxy-bis(difluoromethyl ether), up to 40% by weight.

The same for compositions of points II, VIII and IX wherein a part of difluoromethoxy-bis(difluoromethyl ether) is replaced by 1-difluoromethoxy-1,1,2,2-tetrafluoroethyldifluoromethyl ether up to 50% by weight.

Likewise for the compositions of points X, XIII and XIV wherein a portion of 1-difluoromethoxy-1,1,2,2- tetrafluoroethyl difluoromethyl ether is replaced by difluoromethoxy-bis(difluoromethyl ether) up to 50% by weight.

Another object of the present invention are ternary near azeotropic compositions based on difluoromethoxy-bis (difluoromethyl ether) and hydrocarbons consisting essentially of:

|       |                                                                                       | % by weight |
|-------|---------------------------------------------------------------------------------------|-------------|
| XVI)  | difluoromethoxy-bis(difluoromethyl ether) ($HCF_2OCF_2OCF_2H$);                       | 1–42        |
|       | 1,1-dichoro-2,2,2-trifluoroethane ($CHCl_2CF_3$, HCFC 123)                            | 98–24       |
|       | hydrocarbon                                                                           | 1–35        |
| XVII) | difluoromethoxy-bis(difluoromethyl ether) ($HCF_2OCF_2OCF_2H$);                       | 1–64        |
|       | 1,1,1,3,3-pentafluorobutane ($CF_3CH_2CF_2CH_3$, HFC 365 mfc)                         | 98–1        |
|       | hydrocarbon                                                                           | 1–35        |
| XVIII)| difluoromethoxy-bis(difluoromethyl ether) ($HCF_2OCF_2OCF_2H$);                       | 1–22        |
|       | 1,1,1,4,4,4-hexafluorobutane ($CF_3CH_2CH_2CF_3$, HFC 356 ffa)                        | 98–43       |
|       | hydrocarbon                                                                           | 1–35        |

Among hydrocarbons, n-pentane and iso-pentane are preferred, preferably in the range 1–20% by weight.

Likewise, an object of the present invention are ternary near azeotropic compositions based on difluoromethoxy-bis (difluoromethyl ether) and alcohols essentially consisting of:

|       |                                                                                       | % by weight |
|-------|---------------------------------------------------------------------------------------|-------------|
| XIX)  | difluoromethoxy-bis(difluoromethyl ether) ($HCF_2OCF_2OCF_2H$)                        | 1–55        |
|       | 1,1-dichloro-2,2,2-trifluoroethane ($CHCl_2CF_3$, HCFC 123)                           | 98–35       |
|       | alcohol                                                                               | 1–10        |
| XX)   | difluoromethoxy-bis(difluoromethyl ether) ($HCF_2OCF_2OCF_2H$);                       | 1–89        |
|       | 1,1,1,3,3-pentafluorobutane ($CF_3CH_2CF_2CH_3$, HFC 365 mfc)                         | 98–1        |
|       | alcohol                                                                               | 1–10        |
| XXI)  | difluoromethoxy-bis(difluoromethyl ether) ($HCF_2OCF_2OCF_2H$);                       | 1–35        |
|       | 1,1,1,4,4,4-hexafluorobutane ($CF_3CH_2CH_2CF_3$, HFC 356 ffa)                        | 98–55       |
|       | alcohol                                                                               | 1–10        |

Preferred alcohol is methyl alcohol; preferably between 1 and 5% by weight.

A further object of the present invention are azeotropic or near azeotropic compositions, as described at points from I) to XXI) and from A) to Q), wherein, a portion of HFPE1 and/or HFPE2 is replaced by a hydrofluoropolyethers having the same structure of HFPE1 or HFPE2 but having boiling point in the range of 5–80° C. In this case, one can speak of fluids consisting essentially of HFPE1 and/or HFPE2.

In the detergency applications the mentioned mixtures can be used in combination with stabilizing agents in order to limit the radicalic decomposition reactions which, as known, are favoured by the temperature and the metal presence. The degradation reactions especially concerning the mixtures containing HCFC 123, HFC 356 ffa and 365 mfc, can always be prevented or reduced by the use of nitroparaffins and/or organic substances in the molecule of which conjugated double bonds are present.

The stabilizing agents are generally used in amounts of 0.1–5% by weight.

To the compositions of the invention, non ionic surfactant agents soluble therein can be added to decrease the interfacial tension with water and favour the water removal from the surfaces subjected to drying. The used surfactant concentration is in the range 0.005%–5% by weight on the azeotropic or near azeotropic components, i.e. on the solvent/drying agent.

The compositions of the present invention can be used also in aerosol applications for the electronic components cleaning in combination with one or more propellants, preferably selected from HFC 134a (1,1,1,2-tetrafluoroethane), HFC 227ea (1,1,1,2,3,3,3-heptafluoropropane) or mixtures thereof.

EXAMPLE 1

The evaluation of the azeotropic or near azeotropic behaviour is made as follows: the mixture of known composition and weight is introduced in a small glass cell, previously evacuated, having an internal volume equal to about 20 cm$^3$, equipped with metal connections, feeding valve and a pressure transducer to evaluate the system vapour pressure.

The filling volumetric ratio is initially equal to about 0.8%v.

The cell is introduced in a thermostatic bath and the temperature is slowly changed until obtaining a vapour pressure equilibrium value equal to 1.013 bar. The corresponding temperature is recorded and it represents the mixture boiling temperature at the 1.013 bar pressure.

The temperature is measured close to the equilibrium cell with a thermometer the accuracy of which is equal to ±0.01° C.; particular attention was paid so that the external temperature measured in the bath is really the internal one of the cell.

By changing the mixture composition it is possible to estimate possible deviations with respect to the ideality and therefore to identify the azeotropic composition which, as said, will be characterized by an absolute minimum or maximum with respect to the pure components.

In order to confirm the azeotropic or near azeotropic behaviour, the mixture characterized by a minumum or a maximum of the boiling temperature and others identified close to the azeotrope were subjected to evaporation test at the azeotrope constant temperature.

The cell content is removed at constant temperature by evaporation until having a loss corresponding to 50% by weight of the initial amount.

From the evaluation of the initial and final pressure the per cent variation of the vapour pressure is calculated: if the decrease is equal to zero the mixture in those conditions is an azeotrope, if the decrease is <10% its behaviour is of a near azeotrope.

It is known that a near azetropic mixture has a behaviour closer and closer to a true azeotrope if the per cent variation is lower and lower and near to zero.

As a further confirmation of the azeotropic and near azeotropic behaviour, togheter with the above reported evaluations, analyses of the composition of some mixtures object of the present invention, have been carried out by gaschromatographic method before and after the evaporation test.

The azeotropic mixtures maintain unchanged, within the limits of the error of the analytical methods, the composition after the liquid evaporation, while in the case of near azeotropic systems, limited variations of composition are observed.

In all the measurements reported in Tables from 2 to 18 the visual observation of the liquid phase at its normal boiling temperature has in any case shown that no phase separations took place and that the solutions were limpid and homogeneous.

TABLE 1

Hydrofluoropolyether chemical-physical and toxicological characteristics

| Chemical structure | $HCF_2OCF_2OCF_2H$ (HFPE1) | $HCF_2OCF_2CF_2OCF_2H$ (HFPE2) | CFC 113 1,1,2-tri-chloro 1,2,2-tri-fluroroethane |
|---|---|---|---|
| Molecular mass | 184.04 | 234.05 | 187.38 |
| Boiling temperature (° C., at 1.013 bar) | 35.39 | 58.21 | 47.55 |
| Evaporation latent heat (KJ/Kg, at 1.013 bar) | 165 | 139 | 144 |
| Liquid density at 25° C. (g/cm$^3$) | 1.54 | 1.60 | 1.56 |
| Flammability in air (% volume) | non flammable | non flammable | non flammable |
| ODP CFC 11 = 1 | 0 | 0 | 1.07 |
| lifetime (years) | <10 | <10 | 110 |
| Acute toxicity in rats per os, $LD_{50}$ (ppmv/4 hours) | >5000 | >5000 | 43000 |
| Acute toxicity in rats by inhalation, $LC_{50}$ (ppmv/4 hours) | >32000 | >32000 | 50000 |
| Surface pressure at 20° C. (dynes/cm) | 14.0 | 15.5 | 18.1 |
| Isotherm evaporation speed at 20° C. (mg/min) | 1.5 | 0.6 | 1 |

TABLE No 2 boiling temperature evaluation at the pressure of 1.013 bar
$HCF_2OCF_2OCF_2H$/HCFC 123 binary mixture

| COMPOSITION $HCF_2OCF_2OCF_2H$ (% by wt.) | BOILING TEMPERATURE (° C.) |
|---|---|
| 0 | 27.54 |
| 5.4 | 27.00 |
| 7.7 | 26.77 |
| 13.0 | 26.75 |
| 16.3 | 26.71 |
| 20.1 | 26.70 |
| 24.2 | 26.68 |
| 26.1 | 26.71 |
| 40.0 | 26.96 |
| 49.3 | 27.21 |
| 60.2 | 27.86 |
| 72.6 | 29.39 |
| 100 | 35.39 |

TABLE No. 2a evaluation of the azeotropic and near azeotropic behaviour by determination of the per cent variation of the vapour pressure after evaporation of 50% of the initial liquid mass

| Initial composition (% by wt.) $HCF_2OCF_2OCF_2H$/HCFC 123 | Temperature (° C.) | Initial pressure (bar) | New composition after liquid evaporation of 50% by wt. (% by wt.) $HCF_2OCF_2OCF_2H$/HCFC 123 | ΔP/P × 100 (%) |
|---|---|---|---|---|
| 24.2/75.8 | 26.68 | 1.013 | 24.3/75.7 | 0 |
| 5.5/94.5 | 26.68 | 0.993 | 5.4/94.6 | 0.30 |
| 54.1/45.9 | 26.68 | 0.970 | 58.9/41.1 | 2.06 |

TABLE 3 boiling temperature evaluation at the pressure of 1.013 bar
$HCF_2OCF_2OCF_2H$/n-pentane binary mixture

| COMPOSITION $HCF_2OCF_2OCF_2H$ (% by weight) | BOILING TEMPERATURE (° C.) |
|---|---|
| 0 | 35.79 |
| 12.6 | 26.42 |
| 25.9 | 23.00 |
| 50.0 | 21.45 |
| 61.9 | 21.32 |
| 74.9 | 21.35 |
| 83.4 | 21.49 |
| 87.0 | 21.70 |
| 95.6 | 25.18 |
| 100 | 35.39 |

TABLE 3a evaluation of the azeotropic and near azeotropic behaviour by determination of the vapour pressure per cent variation after evaporation of 50% of the initial liquid mass

| Initial composition (% by wt.) $HCF_2OCF_2OCF_2H$/n-pentane | Temperature (° C.) | Initial pressure (bar) | ΔP/P × 100 (%) |
|---|---|---|---|
| 61.9/38.1 | 21.32 | 1.013 | 0 |
| 50.3/49.7 | 21.32 | 1.010 | 2.47 |
| 84.3/15.7 | 21.32 | 1.006 | 3.08 |

TABLE 4 evaluation of the boiling temperature at the
pressure of 1.013 bar
$HCF_2OCF_2OCF_2H$/iso-pentane binary mixture

| COMPOSITION $HCF_2OCF_2OCF_2H$ (% by wt.) | BOILING TEMPERATURE (° C.) |
|---|---|
| 0 | 27.18 |
| 14.2 | 21.02 |
| 20.4 | 20.00 |
| 39.5 | 17.70 |
| 61.0 | 17.40 |
| 63.1 | 17.35 |
| 80.1 | 17.68 |
| 90.4 | 19.80 |
| 100 | 35.39 |

TABLE 4a evaluation of the azeotropic and near azeotropic behaviour by determination of the vapour pressure per cent variation after evaporation of 50% of the initial liquid mass

| Initial composition (% wt.) $HCF_2OCF_2OCF_2H$/iso-pentane | Temperature (° C.) | Initial pressure (bar) | $\Delta P/P \times 100$ (%) |
|---|---|---|---|
| 63.0/37.0 | 17.35 | 1.013 | 0 |
| 39.0/61.0 | 17.35 | 1.003 | 1.49 |
| 79.8/20.2 | 17.35 | 1.003 | 4.79 |

TABLE 5 evaluation of the boiling temperature at the
pressure of 1.013 bar
$HCF_2OCF_2OCF_2H$/acetone binary mixture

| COMPOSITION $HCF_2OCF_2OCF_2H$ (% by wt.) | BOILING TEMPERATURE (° C.) |
|---|---|
| 0 | 56.50 |
| 28.1 | 57.88 |
| 41.7 | 58.11 |
| 51.0 | 57.98 |
| 61.2 | 56.63 |
| 74.8 | 53.62 |
| 100 | 35.39 |

TABLE 5a evaluation of the azeotropic and near azeotropic behaviour by determination of the vapour pressure per cent variation after evaporation of 50% of the initial liquid mass.

| Initial composition (% by wt.) $HCF_2OCF_2OCF_2H$/acetone | Temperature (° C.) | Initial pressure (bar) | New composition after evaporation of 50% by weight of the liquid (% by wt.) $HCF_2OCF_2OCF_2H$/acetone | $\Delta P/P \times 100$ (%) |
|---|---|---|---|---|
| 41.7/58.3 | 58.11 | 1.013 | 41.8/58.2 | 0 |
| 28.0/72.0 | 58.11 | 1.021 | 31.1/68.9 | 0.88 |
| 50.4/49.6 | 58.11 | 1.019 | 49.7/50.3 | 1.37 |

TABLE 6 evaluation of the boiling temperature at the
pressure of 1.013 bar
$HCF_2OCF_2OCF_2H$/HFC 365 mfc binary mixture

| COMPOSITION $HCF_2OCF_2OCF_2H$ (% by wt.) | BOILING TEMPERATURE (° C.) |
|---|---|
| 0 | 40.09 |
| 10.0 | 36.89 |
| 20.0 | 34.92 |
| 30.0 | 33.71 |
| 40.1 | 33.01 |
| 50.1 | 32.66 |
| 60.1 | 32.60 |
| 75.0 | 33.13 |
| 80.0 | 33.54 |
| 100 | 35.39 |

TABLE 6a evaluation of the azeotropic and near azeotropic behaviour by determination of the vapour pressure per cent variation after evaporation of 50% of the initial liquid mass

| Initial composition (% by wt.) $HCF_2OCF_2OCF_2H$/HFC 365 mfc | Temperature (° C.) | Initial pressure (bar) | $\Delta P/P \times 100$ (%) |
|---|---|---|---|
| 60.1/39.9 | 32.60 | 1.013 | 0 |
| 21.0/78.9 | 32.60 | 0.937 | 5.21 |
| 82.1/17.9 | 32.60 | 0.968 | 7.73 |

TABLE 7 evaluation of the boiling temperature at the
pressure of 1.013 bar
$HCF_2OCF_2OCF_2H$/HFC 356 ffa binary mixture

| COMPOSITION $HCF_2OCF_2OCF_2H$ (% by wt.) | BOILING TEMPERATURE (° C.) |
|---|---|
| 0 | 24.71 |
| 10.1 | 24.16 |
| 19.9 | 24.05 |
| 29.9 | 24.22 |
| 40.0 | 24.65 |
| 49.9 | 25.29 |
| 60.1 | 26.24 |
| 70.1 | 27.60 |
| 80.1 | 29.65 |
| 100 | 35.39 |

TABLE 7a evaluation of the azeotropic and near azeotropic behaviour by determination of the vapour pressure per cent variation after evaporation of 50% of the initial liquid mass

| Initial composition (% by wt.) $HCF_2OCF_2OCF_2H$/HFC 356 ffa | Temperature (° C.) | Initial pressure (bar) | $\Delta P/P \times 100$ (%) |
|---|---|---|---|
| 19.9/80.1 | 24.05 | 1.013 | 0 |
| 4.2/95.8 | 24.05 | 1.000 | 0.41 |
| 38.2/61.8 | 24.05 | 0.994 | 2.21 |

TABLE 8 evaluation of the boiling temperature at the
pressure of 1.013 bar
$HCF_2OCF_2OCF_2H$/metoxymethyl methyl ether binary mixture

| COMPOSITION $HCF_2OCF_2OCF_2H$ (% by wt.) | BOILING TEMPERATURE, °C. |
|---|---|
| 0 | 41.96 |
| 20.1 | 42.80 |
| 27.5 | 43.05 |
| 38.1 | 43.40 |
| 50.6 | 43.78 |
| 59.1 | 43.74 |
| 60.2 | 43.76 |
| 65.0 | 43.53 |
| 72.1 | 42.95 |
| 78.7 | 41.66 |
| 100 | 35.39 |

TABLE 8a evaluation of the azeotropic and near azeotropic
behaviour by determination of the vapour pressure per cent
variation after evaporation of 50% of the initial liquid
mass

| Initial composition (% by wt.) $HCF_2OCF_2OCF_2H$/ methoxymethyl methyl ether | Temperature (°C.) | Initial pressure (bar) | ΔP/P × 100 (%) |
|---|---|---|---|
| 59.1/40.9 | 43.74 | 1.013 | 0 |
| 72.1/27.9 | 43.74 | 1.045 | 2.39 |
| 27.5/72.5 | 43.74 | 1.041 | 2.02 |

TABLE 9 evaluation of the boiling temperature at the
pressure of 1.013 bar
$HCF_2OCF_2OCF_2H$/n-hexane binary mixture

| COMPOSITION $HCF_2OCF_2OCF_2H$ (% by wt.) | BOILING TEMPERATURE (°C.) |
|---|---|
| 0 | 68.00 |
| 15.4 | 43.86 |
| 34.0 | 35.15 |
| 50.8 | 33.12 |
| 65.6 | 32.42 |
| 74.7 | 32.10 |
| 78.1 | 32.15 |
| 90.1 | 32.22 |
| 100 | 35.39 |

TABLE 9a evaluation of the azeotropic and near azeotropic
behaviour by determination of the vapour pressure per cent
variation after evaporation of 50% of the initial liquid
mass

| Initial composition (% by wt.) $HCF_2OCF_2OCF_2H$/ n-hexane | Temperature (°C.) | Initial pressure (bar) | ΔP/P × 100 (%) |
|---|---|---|---|
| 74.7/25.3 | 32.10 | 1.013 | 0 |
| 65.6/34.4 | 32.10 | 1.006 | 0.60 |
| 90.1/9.9 | 32.10 | 1.011 | 0.89 |

TABLE 10 evaluation of the boiling temperature at the
pressure of 1.013 bar
$HCF_2OCF_2OCF_2H$/ tDCE binary mixture

| COMPOSITION $HCF_2OCF_2OCF_2H$ (% by wt.) | BOILING TEMPERATURE (°C.) |
|---|---|
| 0 | 46.70 |
| 6.0 | 40.65 |
| 6.7 | 40.05 |
| 24.2 | 33.02 |
| 40.5 | 30.96 |
| 59.1 | 29.85 |
| 70.2 | 29.79 |
| 75.1 | 29.76 |
| 84.8 | 30.13 |
| 94.2 | 31.88 |
| 100 | 35.39 |

TABLE 10a evaluation of the azeotropic and near azeotropic
behaviour by determination of the vapour pressure per cent
variation after evaporation of 50% of the initial liquid
mass

| Initial composition (% by wt.) $HCF_2OCF_2OCF_2H$/ tDCE | Temperature (°C.) | Initial pressure (bar) | New composition after liquid evaporation of 50% by weight (% by wt.) $HCF_2OCF_2OCF_2H$/tDCE | ΔP/ P × 100 (%) |
|---|---|---|---|---|
| 75.0/24.9 | 29.76 | 1.013 | 75.4/24.5 | 0 |
| 59.2/40.8 | 29.76 | 0.992 | 54.9/45.1 | 0.70 |
| 84.8/15.2 | 29.76 | 0.975 | 88.0/12.0 | 2.50 |

TABLE 11 evaluation of the boling temperature at the
pressure of 1.013 bar
$HCF_2OCF_2CF_2OCF_2H$/n-pentane binary mixture

| COMPOSITION $HCF_2OCF_2CF_2OCF_2H$ (% by wt.) | BOILING TEMPERATURE (°C.) |
|---|---|
| 0 | 35.79 |
| 17.3 | 31.75 |
| 29.1 | 31.52 |
| 60.8 | 31.2 |
| 68.0 | 31.04 |
| 72.1 | 31.08 |
| 74.3 | 31.15 |
| 79.3 | 31.25 |
| 84.3 | 31.77 |

TABLE 11-continued evaluation of the boling temperature at the
pressure of 1.013 bar
HCF$_2$OCF$_2$CF$_2$OCF$_2$H/n-pentane binary mixture

| COMPOSITION HCF$_2$OCF$_2$CF$_2$OCF$_2$H (% by wt.) | BOILING TEMPERATURE (° C.) |
|---|---|
| 93.4 | 35.83 |
| 100 | 58.21 |

TABLE 11a azeotropic and near azeotropic behaviour evaluation by determination of the vapour pressure per cent variation after evaporation of 50% of the initial liquid mass

| Initial composition (% by wt.) HCF$_2$OCF$_2$CF$_2$OCF$_2$H/ n-pentane | Temperature (° C.) | Initial pressure (bar) | ΔP/P × 100 (%) |
|---|---|---|---|
| 60.8/39.2 | 31.02 | 1.013 | 0 |
| 17.3/82.7 | 31.02 | 1.002 | 4.59 |
| 74.3/25.7 | 31.02 | 1.008 | 4.36 |

TABLE 12 boiling temperature evaluation at the pressure of 1.013 bar
HCF$_2$OCF$_2$CF$_2$OCF$_2$H/acetone binary mixture

| COMPOSITION HCF$_2$OCF$_2$CF$_2$OCF$_2$H (% by wt.) | BOILING TEMPERATURE (° C.) |
|---|---|
| 0 | 56.50 |
| 15.5 | 56.83 |
| 30.8 | 58.23 |
| 40.7 | 59.45 |
| 58.6 | 62.87 |
| 70.0 | 65.04 |
| 79.4 | 65.96 |
| 85.5 | 65.28 |
| 89.9 | 64.41 |
| 100 | 58.21 |

TABLE 12a azeotropic and near azeotropic behaviour evaluation by determination of the vapour pressure per cent variation after evaporation of 50% of the initial liquid mass

| Initial composition (% by wt.) HCF$_2$OCF$_2$CF$_2$OCF$_2$H/ acetone | Temperature (° C.) | Initial pressure (bar) | New composition after liquid evaporation of 50% by weight HCF$_2$OCF$_2$CF$_2$OCF$_2$H/ acetone (% by wt.) | ΔP/P × 100 (%) |
|---|---|---|---|---|
| 79.5/20.5 | 65.96 | 1.013 | 79.3/20.7 | 0 |
| 69.5/30.5 | 65.96 | 1.044 | 73.9/26.1 | 2.78 |
| 84.8/15.2 | 65.96 | 1.035 | 82.5/17.5 | 2.90 |

TABLE 13 evaluation of the boiling temperature at the
pressure of 1.013 bar
HCF$_2$OCF$_2$CF$_2$OCF$_2$H/methyl alcohol binary mixture

| COMPOSITION HCF$_2$OCF$_2$CF$_2$OCF$_2$H (% by wt.) | BOILING TEMPERATURE (° C.) |
|---|---|
| 0 | 65.00 |
| 21.0 | 63.15 |
| 40.3 | 59.95 |
| 50.0 | 57.88 |
| 73.8 | 53.45 |
| 84.3 | 52.18 |
| 88.7 | 51.83 |
| 93.9 | 51.38 |
| 96.5 | 53.87 |
| 100 | 58.21 |

TABLE 13a azeotropic and near azeotropic behaviour evaluation by determination of the vapour pressure per cent variation after evaporation of the 50% of the initial liquid mass

| Initial composition (% by wt.) HCF$_2$OCF$_2$CF$_2$OCF$_2$H/ methyl alcohol | Temperature (° C.) | Initial pressure (bar) | ΔP/P × 100 (%) |
|---|---|---|---|
| 93.9/6.1 | 51.38 | 1.013 | 0 |
| 73.5/26.5 | 51.38 | 0.938 | 1.60 |
| 95.8/4.2 | 51.38 | 1.010 | 0.89 |

TABLE 14 boiling temperature evaluation at the pressure of 1.013 bar
HCF$_2$OCF$_2$CF$_2$OCF$_2$H/n-hexane binary mixture

| COMPOSITION HCF$_2$OCF$_2$CF$_2$OCF$_2$H (% by wt.) | BOILING TEMPERATURE (° C.) |
|---|---|
| 0 | 68.00 |
| 20.6 | 56.24 |
| 39.7 | 48.81 |
| 59.9 | 46.74 |
| 73.8 | 46.66 |
| 78.7 | 46.76 |
| 89.9 | 49.00 |
| 100 | 58.21 |

TABLE 14a azeotropic and near azeotropic behaviour evaluation by determination of the vapour pressure per cent variation after evaporation of 50% of the initial liquid mass

| Initial composition (% by wt.) HCF$_2$OCF$_2$CF$_2$OCF$_2$H/ n-hexane | Temperature (° C.) | Initial pressure (bar) | ΔP/P × 100 (%) |
|---|---|---|---|
| 73.8/26.2 | 46.66 | 1.013 | 0 |
| 39.8/60.2 | 46.66 | 0.938 | 7.57 |
| 89.9/10.1 | 46.66 | 0.935 | 8.02 |

TABLE 15 boiling temperature evaluation at the pressure of 1.013 bar
$HCF_2OCF_2CF_2OCF_2H$/tDCE binary mixture

| COMPOSITION $HCF_2OCF_2CF_2OCF_2H$ (% by wt.) | BOILING TEMPERATURE (° C.) |
|---|---|
| 0 | 46.79 |
| 5.6 | 44.16 |
| 20.5 | 41.28 |
| 35.2 | 40.43 |
| 45.1 | 40.22 |
| 50.0 | 40.17 |
| 54.7 | 40.18 |
| 64.9 | 40.26 |
| 75.5 | 40.99 |
| 86.0 | 43.22 |
| 95.0 | 49.37 |
| 100 | 58.21 |

TABLE 15a azeotropic and near azeotropic behaviour evaluation by determination of the vapour pressure per cent variation after evaporation of 50% of the initial liquid mass

| Initial composition (% by wt.) $HCF_2OCF_2CF_2OCF_2H$/ tDCE | Temperature (° C.) | Initial pressure (bar) | New composition after liquid evaporation of 50% by wt. (% by wt.) $HCF_2OCF_2CF_2OCF_2H$/ tDCE | ΔP/ P × 100 (%) |
|---|---|---|---|---|
| 50.0/50.0 | 40.17 | 1.013 | 49.8/50.2 | 0 |
| 44.4/55.6 | 40.17 | 1.010 | 43.1/56.9 | 1.88 |
| 55.3/44.7 | 40.17 | 1.012 | 58.8/41.2 | 2.07 |

TABLE 16 boiling temperature evaluation at the pressure of 1.013 bar
$HCF_2OCF_2CF_2OCF_2H$/ethyl alcohol binary mixture

| COMPOSITION $HCF_2OCF_2CF_2OCF_2H$ (% by wt.) | BOILING TEMPERATURE (° C.) |
|---|---|
| 0 | 78.50 |
| 20.6 | 72.35 |
| 48.9 | 63.70 |
| 62.6 | 60.12 |
| 80.0 | 57.33 |
| 89.7 | 56.07 |
| 94.7 | 55.65 |
| 98.0 | 55.75 |
| 99.0 | 56.02 |
| 100 | 58.21 |

TABLE 16a azeotropic and near azeotropic behaviour evaluation by determination of the vapour pressure per cent variation after evaporation of 50% of the initial liquid mass

| Initial composition (% by wt.) $HCF_2OCF_2CF_2OCF_2H$/ ethyl alcohol | Temperature (° C.) | Initial pressure (bar) | New composition after evaporation of 50% by weight of the liquid (% by wt.) $HCF_2OCF_2CF_2OCF_2H$/ ethyl alcohol | ΔP/ P × 100 (%) |
|---|---|---|---|---|
| 94.7/5.3 | 55.65 | 1.013 | 95.0/5.0 | 0 |
| 79.4/20.6 | 55.65 | 0.954 | 75.6/24.4 | 1.26 |
| 99.0/1.0 | 55.65 | 1.005 | 99.3/0.7 | 2.99 |

TABLE 17

Azeotropic and near azeotropic behaviour evaluation by determination of the vapour pressure per cent variation after evaporation of 50% of the initial liquid mass
Binary mixtures of difluoromethoxy-bis (difluoromethyl ether)/1-difluoromethoxy-1,1,2,2-tetrafluoroethyl difluoromethyl ether

| Initial composition $HCF_2OCF_2OCF_2H$/ $HCF_2OCF_2CF_2OCF_2H$ (% by wt.) | Temperature (° C.) | Initial pressure (bar) | ΔP/P × 100 (%) |
|---|---|---|---|
| 50.0/50.0 | 43.00 | 1.013 | 9.28 |
| 11.8/83.9* | 53.97 | 1.013 | 6.71 |
| 60.3/39.7 | 41.57 | 1.013 | 5.92 |

*contains 4.3% by weight of heavier impurities formed by HFPE having a higher molecular weight

TABLE 18 evaluation of ternary mixture azeotropic behaviour by determination of th vapour pressure per cent variation after evaporation of 50% of the initial liquid mass
Ternary mixtures

| Initial composition (% by wt.) HCFC 123/$HCF_2OCF_2OCF_2H$/ n-pentane | Boiling temperature (° C.) | Initial pressure (bar) | ΔP/P × 100 (%) |
|---|---|---|---|
| 69.5/25.9/4.6 | 24.45 | 1.013 | 7.31 |
| 23.9/55.1/21.0 | 23.86 | 1.013 | 2.83 |
| $HCF_2OCF_2OCF_2H$/ $HCF_2OCF_2CF_2OCF_2H$/acetone 12.0/18.0/70.0 | 57.75 | 1.013 | 3.16 |
| HCFC 123/$HCF_2OCF_2OCF_2H$/ $HCF_2OCF_2CF_2OCF_2H$ 40.0/37.9/22.1 | 30.84 | 1.013 | 5.52 |
| $HCF_2OCF_2OCF_2H$/ $HCF_2OCF_2CF_2OCF_2H$/tCCE 25.6/24.5/49.9 | 34.80 | 1.013 | 5.73 |
| 38.1/36.1/25.1 | 34.32 | 1.013 | 5.82 |
| $HCF_2OCF_2OCF_2H$/ $HCF_2OCF_2CF_2OCF_2H$ n-pentane 30.0/20.0/50.0 | 25.50 | 1.013 | 0.30 |

EXAMPLE 2

The solvent effect of the HFPE-based mixtures is evaluated by determination of the Kauri-butanol index, reported in Table 19, according to ASTM D1133–86 method. The test has been however modified to limit the losses due to the solvent evaporation with boiling temperature lower than 40°

C.; a 100 ml flask is used as vessel for the Kauri-butanol solution; the end part of the buret containing the solvent is inserted in a holed stopper closing the flask so as to carry out the titration limiting the solvent evaporation. The Kauri-butanol solution is stirred by a magnetic stirrer. The end titration point is identified in connection with a diffused turbidity which appears in the Kauri-butanol solution due to the resin separation.

TABLE 19

| Solvent | Composition (% by wt.) | Kauri-butanol index |
|---|---|---|
| CFC 113 (comp) | 100 | 31 |
| HFPE1/HFPE2/HCFC 123 Example composition I | 14.5/9.5/76.0 | 33 |
| HFPE1/HFPE2/n-pentane Example compositions II, X | 12.0/49.0/39.0 | 25 |
| HFPE1/HFPE2/n-hexane Example compositions VII, XIII | 14.8/59.0/26.2 | 26 |
| HFPE1/HFPE2/tDCE Example compositions IX, XIV | 6.2/43.8/50.0 | 24 |

HFPE1 = $HCF_2OCF_2OCF_2H$
HFPE2 = $HCF_2OCF_2CF_2OCF_2H$

EXAMPLE 3

The oily product removal capacity from molded circuits has been verified according to the following method: a known amount of an oily product is uniformly spread on the molded circuit surface having 35×19 mm sizes; 0.100 g of oil are spread on a single surface of the circuit, then the article is dipped in the solution to be tested.

After 5 minutes of dipping, the circuit is allowed to drie for further 5 minutes at room temperature so as to remove the solvent traces and then it is weighed again on an analytical balance.

The following oily products have been used:
1) Alkyl Benzene-Zerice S 46 oil by ESSO
2) FluoroSilicone-FS 1265 oil by DOW CORNIG
3) Ester-Icematic SW 100 oil by CASTROL
4) Mineral-Clavus 32 oil by SHELL.

Tests are carried out at room temperature (23–250° C.) and tests at the boiling temperature of the solvent mixtures. In the latter case the solvent is placed in a vessel equipped with a refrigerant under reflux which recovers the vapour of the boiling solution.

In all the tests 30 ml of solvent solution have been used.
The results are reported in Table 20 expressed as removed oil percentage.

TABLE 20

| SOLVENT | Temperature °C. | Percentage of removed oil for type of oil (% by weight) | | | |
|---|---|---|---|---|---|
| | | (1) | (2) | (3) | (4) |
| CFC 113 (comp) | 23 | 100 # | 99.5 ∎ | 100 # | 100 # |
| HFPE1/HFPE2/HCFC123 (14.5)(9.5)(76.0) Example composition I | 23 | 100 # | 100 # | 100 # | 100 # |
| HFPE1/HFPE2/n-pentane (12.0)(49.0)(39.0) Example compositions II, X | 23 | 100 # | 100 # | 100 # | 100 # |

TABLE 20-continued

| SOLVENT | Temperature °C. | Percentage of removed oil for type of oil (% by weight) | | | |
|---|---|---|---|---|---|
| | | (1) | (2) | (3) | (4) |
| HFPE1/HFPE2/n-esano (14.8)(59.0)(26.2) Example compositions VII, XIII | 23 | 100 # | 100 # | 100 # | 100 # |
| HFPE1/HFPE2/methyl alcohol (18.8)(75.1)(6.1) Example composition XII | 51 | 88.1 ∎ | 100 # | 100 # | 81.0 ∎ |
| HFPE1/HFPE2/tDCE (6.2)(43.8)(50.0) Example compositions IX, XIV | 25 | 100 # | 100 # | 100 # | 100 # |
| HFPE1/HFPE2/acetone (15.9)(63.5)(20.6) Example compositions IV, XI | 66 | 100 ∎ | 100 # | 100 # | 100 ∎ |

HFPE1 = $HCF_2OCF_2OCF_2H$
HFPE2 = $HCF_2OCF_2CF_2OCF_2H$
1) Alkyl Benzene-Zerice S 46 oil by ESSO
2) FluoroSilicone-FS 1265 oil by DOW CORNIG
3) Ester-Icematic SW 100 oil by CASTROL
4) Mineral-Clavus 32 oil by SHELL.
∎ The removed oil is not completely soluble in the solvent mixture at the test temperature
the oil removed is completely soluble in the solvent mixture at the test temperature.

In many cases with the mixtures reported in Table 20 it is possible to obtain a wide solvent action towards oily products of different type with results higher than or comparable with those offered by CFC 113.

Furthermore, the great availability of azeotropic and near azeotropic mixtures allows to select the best composition in connection with the type of oily substance to be removed.

EXAMPLE 4

The HFC 134a and HFC 227 ea solubility with some solvent compositions for aerosol applications for the cleaning of electronic components is reported hereinafter.

TABLE 21

| Solvent compositions (% by wt.) | Propellant | Propellant concentration in admixture with the solvent compositions (% by weight) | Temperature (° C.) | | |
|---|---|---|---|---|---|
| | | | 0 | 25 | 50 |
| HFPE1/HFPE2/ n-hexane (14.8) (59.0) (26.2) | HFC 134a | 49.2 | S | S | S |
| HFPE1/HFPE2/ acetone (15.9) (63.5) (20.6) | HFC 134a | 48.8 | S | S | S |
| HFPE1/HFPE2/- methoxymethyl methylether (35.0) (24.0) (41.0) | HFC 134a | 50.7 | S | S | S |

TABLE 21-continued

| Solvent compositions (% by wt.) | Propellant | Propellant concentration in admixture with the solvent compositions (% by weight) | Temperature (° C.) | | |
|---|---|---|---|---|---|
| | | | 0 | 25 | 50 |
| HFPE1/HFPE2/-methoxymethyl methylether (35.0) (24.0) (41.0) | HFC 227ea | 38.1 | S | S | S |

HFPE1 = HCF$_2$OCF$_2$OCF$_2$H
HFPE2 = HCF$_2$OCF$_2$CF$_2$OCF$_2$H
S = The propellant is completely soluble in the used solvent.

EXAMPLE 5

The water removal from glass surfaces by means of some compositions object of the present invention is described.

In a cylindrical container having a 46 cm diameter and a 56 cm height, equipped with a neoprene closing stopper (cover), 30 ml of the solution to be tested are introduced.

The compositions, indicated in Table 22, used for the water removal tests are prepared in a 50 ml flask and are heated in a thermostatic bath at a temperature of about 5° C. lower than the boiling temperature of the solution itself.

The solutions are added of 600 ppm weight of a surfactant able to reduce the interfacial tension with water and favour the removal phenomenon of this from the surface subjected to drying; the tests have been carried out in comparison with CFC 113 equivalently additioned of a surfactant constituted by 1,1,2-dodecandiammonium-bis[di(3,6 dioxapentadecyl) phosphate].

After heating the solution is transferred in the test container equipped with cover.

On a glass surface having 37×25×1 mm sizes, 0.015 g of water are deposited in the form of small drops.

The glass is placed on a metal frame which is used to carry out the article dipping in the liquid phase of the solution to be tested.

The container for the test is opened and the frame is slowly dipped into the solution; the frame upper part runs in a hole made in the rubber cover (cap) which closes the container.

When two minutes have elapsed, the frame is lifted from the liquid phase, by letting run the external end part through the hole present in the cover (cap); the glass will remain exposed to the solution vapours for one minute, then it is removed from the container and weighed.

In Table 22 the results relating to the water removal tests in comparison with the reference system formed by CFC 113, are reported.

The tested solutions allow to remove water in a similar way to the reference system.

TABLE 22

| AGENT solvent/drying | Temperature (° C.) | removed water (% by weight) |
|---|---|---|
| CFC 113* | 42 | 100 |
| HFPE1/HFPE2/HCFC123 | 23 | 100 |

TABLE 22-continued

| AGENT solvent/drying | Temperature (° C.) | removed water (% by weight) |
|---|---|---|
| (14.5) (9.5) (76.0))* HFPE1/HFPE2/tDCE (6.2) (43.8) (50.0)* | 35 | 100 |

*contains 600 ppm by weight of 1,1,2-dodecandiammonium bis [di-(3,6 dioxapentadecyl)phosphate]

What is claimed is:

1. Azeotropic or near azeotropic compositions, based on difluoromethoxybis(difluoromethyl ether) and/or 1-difluoromethoxy-1,1,2,2-tetrafluoroethyl difluoromethyl ether, selected from the group consisting of:

| | | composition % by weight |
|---|---|---|
| I) | difluoromethoxy bis(difluoromethyl ether) (HCF$_2$OCF$_2$OCF$_2$H); | 2–60 |
| | 1,1-dichloro-2,2,2-trifluoroethane (CHCl$_2$CF$_3$,HCFC 123 | 98–40 |
| II) | difluoromethoxy bis(difluoromethyl ether) (HCF$_2$OCF$_2$OCF$_2$H); | 1–95 |
| | n-pentane | 99–5 |
| III) | difluoromethoxy bis(difluoromethyl ether) (HCF$_2$OCF$_2$OCF$_2$H); | 1–95 |
| | iso-pentane | 99–1 |
| IV) | difluoromethoxy bis(difluoromethyl ether) (HCF$_2$OCF$_2$OCF$_2$H); | 1–60 |
| | dimethyl ketone (acetone) | 99–40 |
| V) | difluoromethoxy bis(difluoromethyl ether) (HCF$_2$OCF$_2$OCF$_2$H); | 1–99 |
| | 1,1,1,3,3-pentafluorobutane (CF$_3$CH$_2$CF$_2$CH$_3$, HFC 365 mfc) | 99–1 |
| VI) | difluoromethoxy bis(difluoromethyl ether) (HCF$_2$OCF$_2$OCF$_2$H); | 1–40 |
| | 1,1,1,4,4,4-hexafluorobutane (CF$_3$CH$_2$CH$_2$CF$_3$, HFC 356 ffa) | 99–60 |
| VII) | difluoromethoxy bis(difluoromethyl ether) (HCF$_2$OCF$_2$OCF$_2$H); | 1–96 |
| | methoxymethyl methylether | 99–14 |
| VIII) | difluoromethoxy bis(difluoromethyl ether) (HCF$_2$OCF$_2$OCF$_2$H); | 30–99 |
| | n-hexane | 70–1 |
| IX) | difluoromethoxy bis(difluoromethyl ether) (HCF$_2$OCF$_2$OCF$_2$H); | 1–99 |
| | trans 1,2-dichloroethylene (ClCHCHCl, tDCE) | 99–1 |
| X) | 1-difluoromethoxy 1,1,2,2-tetrafluoroethyl difluoromethyl ether (HCF$_2$OCF$_2$CF$_2$OCF$_2$H); | 1–93 |
| | n-pentane | 99–7 |
| XI) | 1-difluoromethoxy 1,1,2,2-tetrafluoroethyl difluoromethyl ether (HCF$_2$OCF$_2$CF$_2$OCF$_2$H); | 30–99 |
| | dimethyl ketone (acetone) | 70–1 |
| XII) | 1-difluoromethoxy 1,1,2,2-tetrafluoroethyl difluoromethyl ether (HCF$_2$OCF$_2$CF$_2$OCF$_2$H); | 50–99 |
| | methyl alcohol | 50–1 |

-continued

| | | composition % by weight |
|---|---|---|
| XIII) | 1-difluoromethoxy 1,1,2,2-tetrafluoroethyl difluoromethyl ether (HCF$_2$OCF$_2$CF$_2$OCF$_2$H); | 15–99 |
| | n-hexane | 85–1 |
| XIV) | 1-difluoromethoxy 1,1,2,2-tetrafluoroethyl difluoromethyl ether (HCF$_2$OCF$_2$CF$_2$OCF$_2$H); | 1–99 |
| | trans 1,2-dichloroethylene (ClCHCHCl) | 99–1 |
| XV) | 1-difluoromethoxy 1,1,2,2-tetrafluoroethyl difluoromethyl ether (HCF$_2$OCF$_2$CF$_2$OCF$_2$H); | 5–99 |
| | ethyl alcohol | 95–1 |
| XVI) | difluoromethoxy-bis(difluoromethyl ether) (HCF$_2$OCF$_2$OCF$_2$H); | 1–42 |
| | 1,1-dichloro-2,2,2-trifluoroethane (CHCl$_2$CF$_3$, HCFC 123) | 98–24 |
| | hydrocarbon | 1–35 |
| XVII) | difluoromethoxy-bis(difluoromethyl ether) (HCF$_2$OCF$_2$OCF$_2$H); | 1–64 |
| | 1,1,1,3,3-pentafluorobutane (CF$_3$CH$_2$CF$_2$CH$_3$, HFC 365 mfc) | 98–1 |
| | hydrocarbon | 1–35 |
| XVIII) | difluoromethoxy-bis(difluoromethyl ether) (HCF$_2$OCF$_2$OCF$_2$H); | 1–22 |
| | 1,1,1,4,4,4-hexafluorobutane (CF$_3$CH$_2$CH$_2$CF$_3$, HFC 356 ffa) | 98–43 |
| | hydrocarbon | 1–35 |
| XIX) | difluoromethoxy-bis(difluoromethyl ether) (HCF$_2$OCF$_2$OCF$_2$H); | 1–55 |
| | 1,1-dichloro-2,2,2-trifluoroethane (CHCl$_2$CF$_3$, HCFC 123) | 98–35 |
| | alcohol | 1–10 |
| XX) | difluoromethoxy-bis(difluoromethyl ether) (HCF$_2$OCF$_2$OCF$_2$H); | 1–89 |
| | 1,1,1,3,3-pentafluorobutane (CF$_3$CH$_2$CF$_2$CH$_3$, HFC 365 mfc) | 98–1 |
| | alcohol | 1–10; and |
| XXI) | difluoromethoxy-bis(difluoromethyl ether) (HCF$_2$OCF$_2$OCF$_2$H); | 1–35 |
| | 1,1,1,4,4,4-hexafluorobutane (Cf$_3$CH$_2$CH$_2$CF$_3$, HFC 356 ffa) | 98–55 |
| | alcohol | 1–10. |

2. Azeotropic or near azeotropic compositions according to claim 1, selected from the group consisting of:

| | | composition % by weight |
|---|---|---|
| I) | difluoromethoxy bis(difluoromethyl ether) (HCF$_2$OCF$_2$OCF$_2$H); | 2–54 |
| | 1,1-dichloro-2,2,2-trifluoroethane (CHCl$_2$CF$_3$, HCFC 123) | 98–46 |
| II) | difluoromethoxy bis(difluoromethyl ether) (HCF$_2$OCF$_2$OCF$_2$H); | 25–95 |
| | n-pentane | 75–5 |
| III) | difluoromethoxy bis(difluoromethyl ether) (HCF$_2$OCF$_2$OCF$_2$H); | 25–98 |
| | iso-pentane | 75–2 |

-continued

| | | composition % by weight |
|---|---|---|
| IV) | difluoromethoxy bis(difluoromethyl ether) (HCF$_2$OCF$_2$OCF$_2$H); | 20–60 |
| | ketone (acetone) | 80–40 |
| V) | difluoromethoxy bis(difluoromethyl ether) (HCF$_2$OCF$_2$OCF$_2$H); | 10–98 |
| | 1,1,1,3,3-pentafluorobutane (CF$_3$CH$_2$CF$_2$CH$_3$, HFC 365 mfc) | 90–2 |
| VI) | difluoromethoxy bis(difluoromethyl ether) (HCF$_2$OCF$_2$OCF$_2$H); | 10–40 |
| | 1,1,1,4,4,4-hexafluorobutane (CF$_3$CH$_2$CH$_2$CF$_3$, HFC 356 ffa) | 90–60 |
| VII) | difluoromethoxy bis(difluoromethyl ether) (HCF$_2$OCF$_2$OCF$_2$H); | 25–96 |
| | methoxymethyl methylether | 75–14 |
| VIII) | difluoromethoxy bis(difluoromethyl ether) (HCF$_2$OCF$_2$OCF$_2$H); | 35–98 |
| | n-hexane | 65–2 |
| IX) | difluoromethoxy bis(difluoromethyl ether) (HCF$_2$OCF$_2$OCF$_2$H); | 18–95 |
| | trans 1,2-dichloroethylene (ClCHCHCl, tDCE) | 82–5 |
| X) | 1-difluoromethoxy 1,1,2,2-tetrafluoroethyl difluoromethyl ether (HCF$_2$OCF$_2$CF$_2$OCF$_2$H); | 25–93 |
| | n-pentane | 75–7 |
| XI) | 1-difluoromethoxy 1,1,2,2-tetrafluoroethyl difluoromethyl ether (HCF$_2$OCF$_2$CF$_2$OCF$_2$H); | 50–98 |
| | diethel ketone (acetone) | 50–2 |
| XII) | 1-difluoromethoxy 1,1,2,2-tetrafluoroethyl difluoromethyl ether (HCF$_2$OCF$_2$CF$_2$OCF$_2$H); | 60–98 |
| | methyl alcohol | 40–2 |
| XIII) | 1-difluoromethoxy 1,1,2,2-tetrafluoroethyl difluoromethyl ether (HCF$_2$OCF$_2$CF$_2$OCF$_2$H); | 25–98 |
| | n-hexane | 75–2 |
| XIV) | 1-difluoromethoxy 1,1,2,2-tetrafluoroethyl difluoromethyl ether (HCF$_2$OCF$_2$CF$_2$OCF$_2$H); | 15–95 |
| | trans 1,2-dichloroethylene (ClCHCHCl); and | 85–5 |
| XV) | 1-difluoromethoxy 1,1,2,2-tetrafluoroethyl difluoromethyl ether (HCF$_2$OCF$_2$CF$_2$OCF$_2$H); | 10–98 |
| | ethyl alcohol | 90–2. |

3. Azeotropic compositions according to claim 1 for which an absolute minimum or maximum in the boiling temperature at the pressure of 1.013 bar with respect to the pure products is exhibited and defined as follows:

| | | |
|---|---|---|
| A) | difluoromethoxy-bis(difluoromethyl ether) (HCF$_2$OCF$_2$OCF$_2$H); | 24% by wt. |
| | 1,1-dichloro-2,2,2-trifluoroethane (CHCl$_2$CF$_3$, HCFC 123) | 76% by wt. |

-continued

| | | |
|---|---|---|
| B) | difluoromethoxy-bis(difluoromethyl ether) ($HCF_2OCF_2OCF_2H$); | 62% by wt. |
| | n-pentane | 38% by wt. |
| C) | difluoromethoxy-bis(difluoromethyl ether) ($HCF_2OCF_2OCF_2H$); | 63% by wt. |
| | iso-pentane | 36% by wt. |
| D) | difluoromethoxy-bis(difluoromethyl ether) ($HCF_2OCF_2OCF_2H$); | 42% by wt. |
| | dimethyl ketone (acetone) | 58% by wt. |
| E) | difluoromethoxy-bis(difluoromethyl ether) ($HCF_2OCF_2OCF_2H$); | 60% by wt. |
| | 1,1,1,3,3-pentafluorobutane ($CF_3CH_2CF_2CH_3$, HFC 365 mfc) | 40% by wt. |
| F) | difluoromethoxy-bis(difluoromethyl ether) ($HCF_2OCF_2OCF_2H$); | 20% by wt. |
| | 1,1,1,4,4,4-hexafluorobutane ($CF_3CH_2CH_2CF_3$, HFC 356 ffa) | 80% by wt. |
| G) | difluoromethoxy-bis(difluoromethyl ether) ($HCF_2OCF_2OCF_2H$); | 59% by wt. |
| | methoxymethyl methyl ether | 41% by wt. |
| H) | difluoromethoxy-bis(difluoromethyl ether) ($HCF_2OCF_2OCF_2H$); | 75% by wt. |
| | n-hexane | 25% by wt. |
| I) | difluoromethoxy-bis(difluoromethyl ether) ($HCF_2OCF_2OCF_2H$); | 75% by wt. |
| | trans 1,2-dichloroethylene (ClCHCHCl, tDCE) | 25% by wt. |
| | 1-difluoromethoxy-1,1,2,2-tetrafluoroethyl difluoromethyl ether ($HCF_2OCF_2CF_2OCF_2H$); | 61% by wt. |
| | n-pentane | 39% by wt. |
| M | 1-difluoromethoxy-1,1,2,2-tetrafluoroethyl difluoromethyl ether ($HCF_2OCF_2CF_2OCF_2H$); | 79% by wt. |
| | dimethyl ketone (acetone) | 21% by wt. |
| N) | 1-difluoromethoxy-1,1,2,2-tetrafluoroethyl difluoromethyl ether ($HCF_2OCF_2CF_2OCF_2H$); | 94% by wt. |
| | methyl alcohol | 6% by wt. |
| O) | 1-difluoromethoxy-1,1,2,2-tetrafluoroethyl difluoromethyl ether ($HCF_2OCF_2CF_2OCF_2H$); | 74% by wt. |
| | n-hexane | 26% by wt. |
| P) | 1-difluoromethoxy-1,1,2,2-tetrafluoroethyl difluoromethyl ether ($HCF_2OCF_2CF_2OCF_2H$); | 50% by wt. |
| | trans 1,2-dichloroethylene (ClCHCHCl, tDCE); and | 50% by wt. |
| Q) | 1-difluoromethoxy-1,1,2,2-tetrafluoroethyl difluoromethyl ether ($HCF_2OCF_2CF_2OCF_2H$); | 95% by wt. |
| | ethyl alcohol | 5% by wt. |

4. Near azeotropic compositions according to claim 1, selected from the group consisting of:

| | | composition % by weight |
|---|---|---|
| I) | difluoromethoxy bis(difluoromethyl ether) ($HCF_2OCF_2OCF_2H$); | 2–60 |
| | 1,1-dichloro-2,2,2-trifluoroethane ($CHCl_2CF_3$, HCFC 123) | 98–40 |
| III) | difluoromethoxy bis(difluoromethyl ether) ($HCF_2OCF_2OCF_2H$); | 1–99 |
| | iso-pentane | 99–1 |
| IV) | difluoromethoxy bis(difluoromethyl ether) ($HCF_2OCF_2OCF_2H$); | 1–60 |
| | dimethyl ketone (acetone) | 99–40 |
| V) | difluoromethoxy bis(difluoromethyl ether) ($HCF_2OCF_2OCF_2H$); | 1–99 |
| | 1,1,1,3,3-pentafluorobutane ($CF_3CH_2CF_2CH_3$, HFC 365 mfc) | 99–1 |
| VI) | difluoromethoxy bis(difluoromethyl ether) ($HCF_2OCF_2OCF_2H$); | 1–40 |
| | 1,1,1,4,4,4-hexafluorobutane ($CF_3CH_2CH_2CF_3$, HFC 356 ffa); and | 99–60 |
| VII) | difluoromethoxy bis(difluoromethyl ether) ($HCF_2OCF_2OCF_2H$); | 1–96 |
| | methoxymethyl ether | 99–14 | wherein the difluoromethoxy-bis(difluoromethyl ether) part contains up to 40% by weight of 1-difluoromethoxyl1,1,2,2-tetrafluoroethyldifluoromethyl ether.

5. Near azeotropic compositions according to claim 1, selected from the group consisting of:

| | | composition % by weight |
|---|---|---|
| XI) | 1-difluoromethoxy 1,1,2,2-tetrafluoroethyl difluoromethyl ether ($HCF_2OCF_2CF_2OCF_2H$); | 30–99 |
| | dimethyl ketone (acetone) | 70–1 |
| XII) | 1-difluoromethoxy 1,1,2,2-tetrafluoroethyl difluoromethyl ether ($HCF_2OCF_2CF_2OCF_2H$); | 50–99 |
| | methyl alcohol | 50–1; and |
| XV) | 1-difluoromethoxy 1,1,2,2-tetrafluoroethyl difluoromethyl ether ($HCF_2OCF_2CF_2OCF_2H$); | 5–99 |
| | ethyl alcohol | 95–1 | wherein 1-difluoromethoxy-1,1,2,2-tetrafluoroethyl difluoromethyl ether contains up to 40% by weight of difluoromethoxy-bis(difluoromethyl ether).

6. Near azeotropic compositions according to claim 1, selected from the group consisting of:

| | | composition % by weight |
|---|---|---|
| II) | difluoromethoxy bis(difluoromethyl ether) ($HCF_2OCF_2OCF_2H$); | 1–95 |
| | n-pentane | 99–5 |
| VIII) | difluoromethoxy | 30–99 |

-continued

|  |  | composition % by weight |
|---|---|---|
|  | bis(difluoromethyl ether) (HCF$_2$OCF$_2$OCF$_2$H); |  |
|  | n-hexane | 70–1; and |
| IX) | difluoromethoxy bis(difluoromethyl ether) (HCF$_2$OCF$_2$OCF$_2$H); | 1–99 |
|  | trans 1,2-dichloroethylene (ClCHCHCl, tDCE) | 99–1 | wherein difluoromethoxy-bis(difluoromethyl ether) contains up to 50% of 1-difluoromethoxy-1,1,2,2-tetrafluoroethyl difluoromethyl ether.

7. Near azeotropic compositions according to claim 1, selected from the group consisting of:

|  |  | composition % by weight |
|---|---|---|
| X) | 1-difluoromethoxy 1,1,2,2-tetrafluoroethyl difluoromethyl ether (HCF$_2$OCF$_2$CF$_2$OCF$_2$H); | 1–93 |
|  | n-pentane | 99–7 |
| XIII) | 1-difluoromethoxy 1,1,2,2-tetrafluoroethyl difluoromethyl ether (HCF$_2$OCF$_2$CF$_2$OCF$_2$H); | 15–99 |
|  | n-hexane | 85–1; and |
| XIV) | 1-difluoromethoxy 1,1,2,2-tetrafluoroethyl difluoromethyl ether (HCF$_2$OCF$_2$CF$_2$OCF$_2$H); | 1–99 |
|  | trans 1,2-dichloroethylene (ClCHCHCl) | 99–1 | wherein the 1-difluoromethoxy-1,2,2,2-tetrafluoroethyl difluoromethyl ether contains up to 50% by weight of difluoromethoxy-bis(difluoromethyl ether).

8. Near azeotropic compositions according to claim 1, based on difluoromethoxy-bis(difluoromethyl ether) and hydrocarbons selected from the group consisting of:

|  |  | composition % by weight |
|---|---|---|
| XVI) | difluoromethoxy-bis(difluoromethyl ether) (HCF$_2$OCF$_2$OCF$_2$H); | 1–42 |
|  | 1,1-dichloro-2,2,2-trifluoroethane (CHCl$_2$CF$_3$, HCFC 123) | 98–24 |
|  | hydrocarbon | 1–35 |
| XVII) | difluoromethoxy-bis(difluoromethyl ether) (HCF$_2$OCF$_2$OCF$_2$H); | 1–64 |
|  | 1,1,1,3,3-pentafluorobutane (CF$_3$CH$_2$CF$_2$CH$_3$, HFC 365 mfc) | 98–1 |
|  | hydrocarbon | 1–35; and |
| XVIII) | difluoromethoxy-bis(difluoromethyl ether) (HCF$_2$OCF$_2$OCF$_2$H); | 1–22 |
|  | 1,1,1,4,4,4-hexafluorobutane (CF$_3$CH$_2$CH$_2$CF$_3$, HFC 356 ffa) | 98–43 |
|  | hydrocarbon | 1–35. -- |

9. Compositions according to claim 8, wherein hydrocarbon is selected between n-pentane and iso-pentane.

10. Compositions according to claim 8, wherein hydrocarbon is present in the range 1–20% by weight.

11. Near azeotropic compositions according to claim 1, based on difluoromethoxy-bis(difluoromethyl ether) and alcohol selected from the group essentially consisting of:

|  |  | composition % by weight |
|---|---|---|
| XIX) | difluoromethoxy-bis(difluoromethyl ether) (HCF$_2$OCF$_2$OCF$_2$H); | 1–55 |
|  | 1,1-dichloro-2,2,2-trifluoroethane (CHCl$_2$CF$_3$, HCFC 123) | 98–35 |
|  | alcohol | 1–10 |
| XX) | difluoromethoxy-bis(difluoromethyl ether) (HCF$_2$OCF$_2$OCF$_2$H); | 1–89 |
|  | 1,1,1,3,3-pentafluorobutane (CF$_3$CH$_2$CF$_2$CH$_3$, HFC 365 mfc) | 98–1 |
|  | alcohol | 1–10; and |
| XXI) | difluoromethoxy-bis(difluoromethyl ether) (HCF$_2$OCF$_2$OCF$_2$H); | 1–35 |
|  | 1,1,1,4,4,4-hexafluorobutane (CF$_3$CH$_2$CH$_2$CF$_3$, HFC 356 ffa) | 98–55 |
|  | alcohol | 1–10. -- |

12. Compositions according to claim 11, wherein alcohol is methyl alcohol.

13. Compositions according to claim 11, wherein alcohol is present between 1 and 5% by weight.

14. Azeotropic or near azeotropic compositions according to claim 1, wherein the ether part can contain at least up to 10% by weight of hydrofluoro ethers having same structure having a boiling point in the range 5–80° C.

15. A method for removing contaminants from surfaces wherein said surfaces are contacted with substitutes for CFC 113, comprising azeotropic and near azeotropic compositions selected from the group consisting of:

|  |  | composition % by weight |
|---|---|---|
| I) | difluoromethoxy bis(difluoromethyl ether) (HCF$_2$OCF$_2$OCF$_2$H); | 2–60 |
|  | 1,1-dichloro-2,2,2-trifluoroethane (CHCl$_2$CF$_3$, HCFC 123) | 98–40 |
| II) | difluoromethoxy bis(difluoromethyl ether) (HCF$_2$OCF$_2$OCF$_2$H); | 1–95 |
|  | n-pentane | 95–5 |
| III) | difluoromethoxy bis(difluoromethyl ether) (HCF$_2$OCF$_2$OCF$_2$H); | 1–99 |
|  | iso-pentane | 99–1 |
| IV) | difluoromethoxy bis(difluoromethyl ether) (HCF$_2$OCF$_2$OCF$_2$H); | 1–60 |
|  | dimethyl ketone (acetone) | 99–40 |
| V) | difluoromethoxy bis(difluoromethyl ether) (HCF$_2$OCF$_2$OCF$_2$H); | 1–99 |
|  | 1,1,1,3,3-pentafluorobutane (CF$_3$CH$_2$CF$_2$CH$_3$, HFC 365 mfc) | 99–1 |
| VI) | difluoromethoxy bis(difluoromethyl ether) (HCF$_2$OCF$_2$OCF$_2$H); | 1–40 |
|  | 1,1,1,4,4,4-hexafluorobutane (CF$_3$CH$_2$CF$_2$CF$_3$, HFC 356 ffa) | 99–60 |
| VII) | difluoromethoxy bis(difluoromethyl ether) (HCF$_2$OCF$_2$OCF$_2$H); | 1–96 |
|  | methoxymethyl methylether | 99–14 |

-continued

| | | composition % by weight |
|---|---|---|
| VIII) | difluoromethoxy bis(difluoromethyl ether) ($HCF_2OCF_2OCF_2H$); | 30–99 |
| | n-hexane | 70–1 |
| IX) | difluoromethoxy bis(difluoromethyl ether) ($HCF_2OCF_2OCF_2H$); | 1–99 |
| | trans 1,2-dichloroethylene (ClCHCHCl, tDCE) | 99–1 |
| X) | 1-difluoromethoxy 1,1,2,2-tetrafluoroethyl difluoromethyl ether ($HCF_2OCF_2CF_2OCF_2H$); | 1–93 |
| | n-pentane | 99–7 |
| XI) | 1-difluoromethoxy 1,1,2,2-tetrafluoroethyl difluoromethyl ether ($HCF_2OCF_2CF_2OCF_2H$); | 30–99 |
| | dimethyl ketone (acetone) | 70–1 |
| XII) | 1-difluoromethoxy 1,1,2,2-tetrafluoroethyl difluoromethyl ether ($HCF_2OCF_2CF_2OCF_2H$); | 50–99 |
| | methyl alcohol | 50–1 |
| XIII) | 1-difluoromethoxy 1,1,2,2-tetrafluoroethyl difluoromethyl ether ($HCF_2OCF_2CF_2OCF_2H$); | 15–99 |
| | n-hexane | 85–1 |
| XIV) | 1-difluoromethoxy 1,1,2,2-tetrafluoroethyl difluoromethyl ether ($HCF_2OCF_2CF_2OCF_2H$); | 1–99 |
| | trans 1,2-dichloroethylene (ClCHCHCl) | 99–1 |
| XV) | 1-difluoromethoxy 1,1,2,2-tetrafluoroethyl difluoromethyl ether ($HCF_2OCF_2CF_2OCF_2H$); | 5–99 |
| | ethyl alcohol | 95–1 |
| XVI) | difluoromethoxy-bis(difluoromethyl ether) ($HCF_2OCF_2OCF_2H$); | 1–42 |
| | 1,1-dichloro-2,2,2-trifluoroethane ($CHCl_2CF_3$, HFC 123) | 98–1 |
| | hydrocarbon | 1–35 |
| XVII) | difluoromethoxy-bis(difluoromethyl ether) ($HCF_2OCF_2OCF_2H$); | 1–64 |
| | 1,1,1,3,3-pentafluorobutane ($CF_3CH_2CF_2CH_3$, HFC 365 mfc) | 98–1 |
| | hydrocarbon | 1–35 |
| XVIII) | difluoromethoxy-bis(difluoromethyl ether) ($HCF_2OCF_2OCF_2H$); | 1–22 |
| | 1,1,1,4,4,4-hexafluorobutane ($CF_3CH_2CH_2CF_3$, HFC 356 ffa) | 98–43 |
| | hydrocarbon | 1–35 |
| XIX) | difluoromethoxy-bis(difluoromethyl ether) ($HCF_2OCF_2OCF_2H$); | 1–55 |
| | 1,1-dichloro-2,2,2-trifluoroethane ($CHCl_2CF_3$, HFC 123) | 98–35 |
| | alcohol | 1–10 |
| XX) | difluoromethoxy-bis(difluoromethyl ether) ($HCF_2OCF_2OCF_2H$); | 1–89 |
| | 1,1,1,3,3-pentafluorobutane ($CF_3CH_2CF_2CH_3$, HFC 365 mfc) | 98–1 |
| | alcohol | 1–10; and |
| XXI) | difluoromethoxy-bis(difluoromethyl ether) ($HCF_2OCF_2OCF_2H$); | 1–35 |
| | 1,1,1,4,4,4-hexafluorobutane ($CF_3CH_2CH_2CF_3$, HFC 356 ffa) | 98–55 |
| | alcohol | 1–10. |

16. The method according to claim 15, wherein the compositions further comprise one or more non-ionic surfactants wherein the concentration of said one or more surfactants is in the range 0.005–5% by weight based on the azeotropic or near azeotropic components.

17. The method according to claim 15, wherein the composition further comprises solvent/drying agents.

18. The method according to claim 17, wherein stabilizers for radicalic decomposition reactions are added to the composition in concentrations in the range 0.1–5% by weight with respect to the solvent-detergent and/or drying agent.

19. The method according to claim 15, wherein the compositions are combined with one or more propellants for the cleaning electronic components.

20. The method according to claim 19, wherein the propellant is selected from: HFC 134a (1,1,1,2-tetrafluoroethane), HFC 227ea (1,1,1,2,3,3,3-heptafluoropropane) or mixtures thereof.

* * * * *